(12) United States Patent  
Bromer

(10) Patent No.: US 7,061,395 B1
(45) Date of Patent: Jun. 13, 2006

(54) LOCATING ITEMS WITH FLICKERING LAMPS

(76) Inventor: Nick Bromer, 402 Stacktown Rd., Marietta, PA (US) 17547-9311

( * ) Notice: Subject to any disclaimer, the term of this patent is extended or adjusted under 35 U.S.C. 154(b) by 157 days.

(21) Appl. No.: 10/287,394

(22) Filed: Nov. 4, 2002

Related U.S. Application Data

(62) Division of application No. 09/987,241, filed on Nov. 14, 2001, now Pat. No. 6,476,715.

(60) Provisional application No. 60/290,687, filed on May 15, 2001.

(51) Int. Cl.
*G08B 5/00* (2006.01)

(52) U.S. Cl. .................. 340/815.63; 235/472.01; 340/5.92; 705/28

(58) Field of Classification Search ............. 340/500, 340/534, 3.1, 5.9, 5.91, 5.92, 815.45, 815.63; 235/472.01, 462.01, 383, 494, 462.16, 438; 705/22, 28, 29 X
See application file for complete search history.

(56) References Cited

U.S. PATENT DOCUMENTS

| 5,172,113 | A | * | 12/1992 | Hamer | 340/907 |
| 5,214,268 | A | * | 5/1993 | Doing | 235/472 |
| 5,380,994 | A | * | 1/1995 | Ray | 235/462.45 |
| 5,760,383 | A | * | 6/1998 | Heske, III | 235/462 |
| 6,089,453 | A | * | 7/2000 | Kayser et al. | 235/383 |
| 6,476,715 | B1 | * | 11/2002 | Bromer | 340/468 |

* cited by examiner

Primary Examiner—Brent A. Swarthout

(57) ABSTRACT

Items, including lost items or items out of place, can be located by attaching flickering LED's to them and moving about with a detector that registers the presence of the desired item or items by decoding the flickers. The flickers can substitute for, or augment, ordinary printed bar codes, and can use the same encoding so that the temporal pattern of flickering corresponds to the spatial pattern of black and white stripes in the printed bar code. The flickering items can be registered from a distance and from among a large group of other flickering items.

15 Claims, 1 Drawing Sheet

LOCATING ITEMS WITH FLICKERING LAMPS

CROSS REFERENCE TO RELATED APPLICATION

This application is a division of application Ser. No. 09/987,241, filed by the same Applicant on Nov. 14, 2001, now U.S. Pat. No. 6,476,715 and entitled LAND VEHICLE IDENTIFICATION BY FLICKERING LAMPS. The entire contents of application Ser. No. 09/987,241 are entirely incorporated herein by reference, including those portions of application Ser. No. 09/987,241 that were incorporated therein by reference and did not appear in the text of application Ser. No. 09/987,241. The Applicant's application Ser. No. 09/987,341 claimed benefit of the filing date of application Ser. No. 60/290,687, and also incorporated the whole disclosure of that provisional application Ser. No. 60/290,687 by reference. Therefore this divisional application incorporates the subject matter of application Ser. No. 60/290,687. Under MPEP §608.01(p)B, the present application has benefit of the filing date of application Ser. No. 60/290,687, which was May 15, 2001.

REVIEW OF THE RELATED ART

Bar codes are widely used in many areas for identifying objects or items. Bar codes are an inexpensive way of labeling anything. However, bar codes have drawbacks, too.

The reliability of a bar code is not very high, because there are many factors that can complicate the reading of a bar code. Dirt and scratches, for example, can cause a misreading. The process of reading of a bar code is difficult, even when there is no overt problem like a mangled bar code. This difficulty further decreases the reliability.

There has been no more reliable system for labeling items with bar code information or similar information. Therefore, one object of this invention is to provide a more reliable system of labeling items with bar code information.

Also, a printed bar code cannot be used to locate an item in an area or among a collection of items, except by scanning each one of the items, which is usually impractical.

Therefore, a second object of this invention is to use bar code information for locating items.

SUMMARY OF THE INVENTION

The invention comprises an optical process of locating an item (i.e., determining if an item is in a particular area at a particular time). A flickering lamp unit is attached to each item that might need to be located. The lamp unit might include a lamp (preferably an LED), a flicker generator (preferably an integrated circuit), a power source (battery, etc.), and an attachment. The attachment might be a clip, if the flickering lamp unit is in the form of a tag, glue if the unit is a sticker, or, any other thing that will attach the lamp to the item, preferably so that it can be removed. The flicker pattern encodes the identity of the item either individually, or by a group or groups that it belongs to, or both.

The invention can also comprise a detector that senses and decodes the flickers and registers the identified item, or sounds an alarm.

If the temporal flicker pattern mimics the spatial pattern of a printed bar code that might already be associated with an item, then a special detector might not be needed. For example, if the item is a library book, then the standard library bar code of a book could be embodied in the flickering LED attached to the book. In that case, the radiating LED will register the book in the usual scanner, if the book is brought near to the scanner; the bar code need not be in the scanning beam.

Another application is in finding files (dossiers, folders, etc.) in an office. Office files are now commonly bar coded, which makes it easy to verify the identity of that file with a scanner. But the bar codes do not help in locating a lost file. With the invention, each file includes a device that flickers at an interval, such as every few seconds, so that a stack of files flashes like fireflies at night, with each flash being the flicker. Each file flickers a pattern that identifies that particular file, or the group (subset) of files to which that particular item belongs; preferably, the flicker pattern includes different fields that allow searching for a subset, a superset, or an individual file, as needed. To find a flickering file, a passive hand-held detector with a photodiode can be programmed to beep when it "sees" a particular flicker pattern. When aimed at a stack of flickering files, the detector will beep after a second or two if the missing file is there. Then the detector can be moved in so that its angle of detection covers a smaller area of the stack of files, and the file thereby located precisely. This will prevent loss of files by mis-filing, which can be a problem in places, such as law firms, with many files.

Various other applications will arise, wherever the difficulties or costs of scanning a bar code are greater than the difficulties or costs of providing a flickering lamp, or where greater reliability of reading a bar code is required. The invention can identify and/or register (e.g., tally) an item or thing as a member of a proper subset of more than one element, for example, as one member of a group. In the example of a file-finder noted above, the invention could be used to distinguish any member of a group of files, rather than each individual file; that is, the members of the group (elements of the subset) would share a bar code pattern.

The system of the present invention contemplates that the flickering lamp may be attached to each item or, alternatively, associated with a supply of items by being attached or located adjacent to a group, a container, or a dispenser of the items.

BRIEF DESCRIPTION OF THE DRAWING FIGURES

DETAILED DESCRIPTION OF THE PREFERRED EMBODIMENTS

Figure 1:
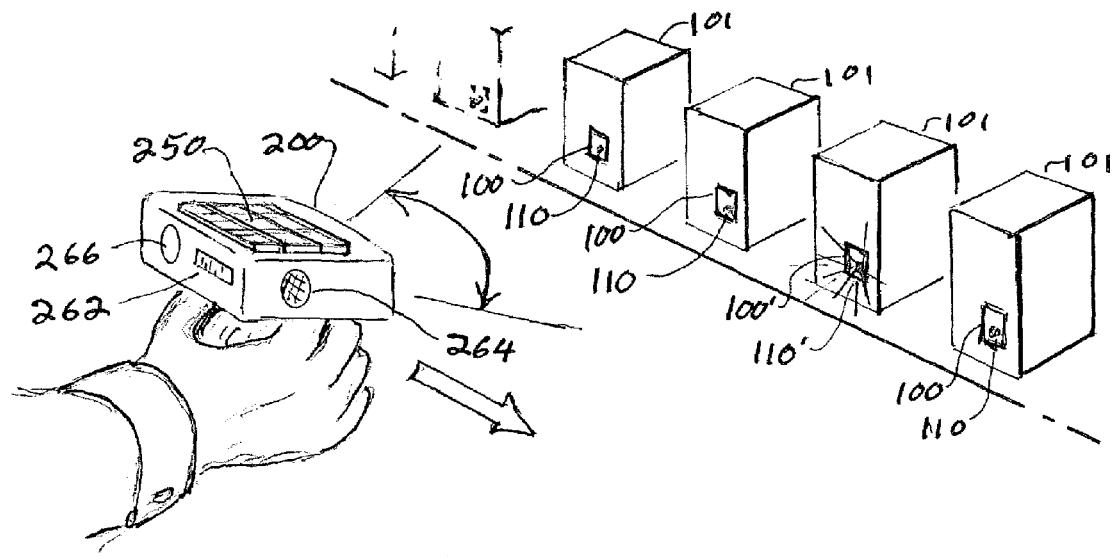
FIG. 1 is a perspective view showing a detector being moved relative to a collection of flickering items.

FIG. 1 shows a preferred embodiment of the invention. At least some (preferably all) of a collection of items 101 are equipped with attached lamp units 100 with a lamp 110. At the instant depicted in the drawing, the lamp 110' of one of the lamp units 100' is emitting a flicker of light (visible, infrared, or ultraviolet); this is illustrated by rays from the lamp 110'. At a future time, the lamps of the other units may radiate light; this is discussed below. The flickering light is in a pattern that encodes an identifier of the item 101.

A detector 200 is shown being held near the items 101. The detector has a location detection range indicated by the solid, curved, double-headed arrow. As is explained below, if an item 101 flickers within the range of the detector, the presence of the item at that location will be registered. The detector 200 has a light sensor (not shown in FIG. 1), for example a photodiode, that turns the flickering light into a signal voltage that is analyzed by the electronics of the detector 200 (discussed below). The electronics are preferably similar to the electronics used in bar code readers. If the flickering is encoded in a standard bar code encryption, off-the-shelf electronics can be used in the detector 200.

The detector 200 includes an entry or input device, preferably a keypad 250, that inputs numbers and/or letters (or other symbols) that are to be searched for. Any other kind of data input can be used, including wires downloading data from a computer, a swiped magnetic card or other magnetic medium, an optical link, an optical medium, and so on. Preferably also there is an alarm, such as a buzzer 264 or a flashing light 266. Any type of alarm/notification can be used in this invention.

The detector 200 is moved over the collection of items (if it is too large to fit entirely within the location detection range of the detector 200) until an item being sought is registered, according to its group/identity (a group it belongs to, or else its individual identity), when the user is notified. The movement is indicated by the hollow arrow in FIG. 1.

For example, the items 101 might be case files in a law firm. Often, such files are "missing" and cannot be located for long periods of time. With this invention, such files can be located by walking around the office with a detector. If an individual file is desired, then the individual file identifier is entered via the keypad 250, and the user points the detector at all areas where the file might be: areas in the file room where it might be mis-shelved, offices, etc. As soon as the item sought is within the location detection range, the alarm 264 or 266 notifies the user. Then, the user can "zoom in" to find the precise place where the file is.

The invention can also be used to detect mis-shelving, by entering only a partial identifier that is shared with other files. For example, case files might include the year as part of the identifier, so that in one area of the file room all the file identifiers contain "2000" while in other areas all contain "2001," "1999," and so on. If the detector 200 is set to register "2001" then it should register nothing when pointed at the 1999 or 2001 area, but should register when it is moved to the 2000 area. Thus, if it registers when pointed at the 1999 area, there is a mis-filed case file in that location detection range that should be moved to its proper area.

It is to be noted that the flicker of any one item 101 need not be an individual identifier. The flicker may be shared with any number of other items, and still be useful. Most useful is when the item identifier can register an individual item or a group.

In FIG. 1, the detector also includes an optional alphanumeric display, such as an LCD, that can display registered flicker data. If a detector so equipped can not only look for an input item identifier, but also display all registered identifiers. Moved along a rack of items, it would sequentially read out the identifiers of the items, allowing the user to check the sequence and find items out of sequence.

The detector 200 may include a translator to change a flicker pattern into a sequential identifier; for example, if the items are library books but the bar codes on the library books do not embody the sequential call number (Dewey decimal or Library of Congress number), the detector may include, or have means for connecting to, a translator so that the call number is displayed when a book is registered.

The lamp units 100 can be of any form, preferably are removable, and preferably include batteries or solar cells or both for power. The units 105 should be arranged so that the lamps 110 are not likely to be covered when the items are stacked, arrayed, piled, or otherwise collected.

Figure 2:
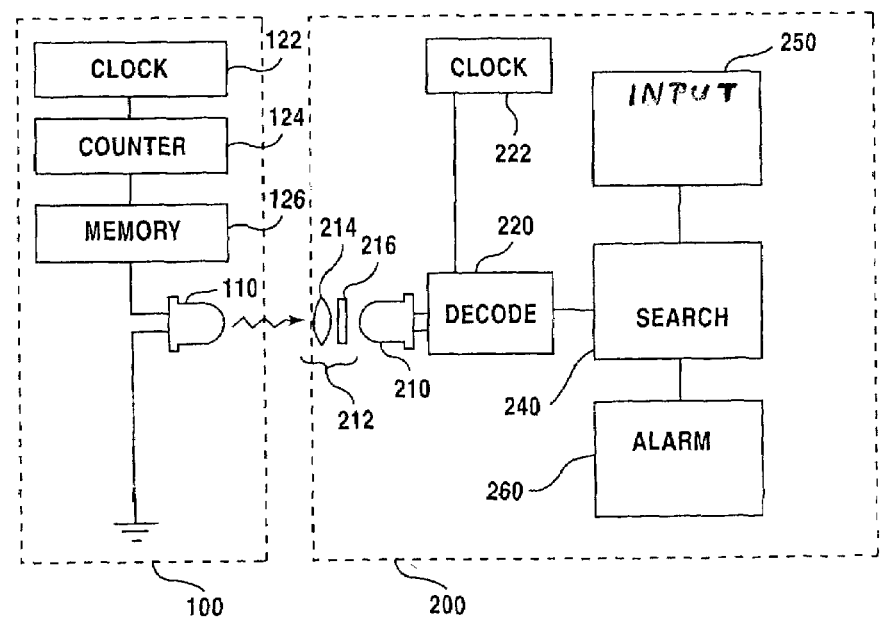
FIG. 2 is a schematic view of the invention

FIG. 2 shows the preferred electronic operations of the invention in schematic form. The lamp 110, preferably a visible or infrared LED, is driven by a free-running clock 122 through a counter 124 and a memory 126. The clock 122 preferably runs freely whenever it is powered. The clock 122 may be also be triggered, in alternative embodiments. As the clock 122 runs, it increments the counter 124, and the counter outputs binary integers that increment unit by unit (e.g., 0000, 0001, 0010, 0011, . . . ) while the clock 122 is running. This output from the counter is used as an input to the memory 126, so that the contents of locations in the memory 126 are successively read out to control the output of the lamp 110. That is, each of the integers output from the counter functions as a memory selector. If the addressed memory location stores "1" the lamp 110 is lit, and if stores "0" the lamp 110 is dark (or, the other way around if desired). Inverters, amplifiers, transistors, and the like can be added to the circuit as needed, or the entire circuit as illustrated can be replaced with some other equivalent circuit that does the same job of making the lamp 110 flicker out a predetermined pattern.

The item identifier is preferably stored in the memory 126 in a PROM (Programmable Read-Only Memory); this type of memory is blank until it is permanently set by "burning" on a commercially-available machine; by using a PROM or equivalent, the identifier can be quickly and permanently set into any one of a number of identical and therefore inexpensive memory devices. The clock 122, counter 124, memory 126, and/or the LED lamp 110 can all be manufactured on one chip for lower cost and greater reliability. Even a solar cell and small battery can be made part of an integrated circuit chip.

Flickering light from the LED 110, indicated in FIG. 2 by a jagged arrow, goes from the unit 100 in the item to the detector 200. The light may pass through an optical system 212 to illuminate a light-sensitive transducer 210, such as a photodiode or phototransistor, which generates a voltage or electric current signal corresponding to the light impinging on it; or, the photodetector may be bare. The optical system 212 may include, as desired, a reflector or lens 214 to concentrate the flickering light and a filter 216 to eliminate light of other wavelengths. For example, if the lamp 110 is a common red LED that outputs light of wavelength 660 nanometers, then a narrow-pass 660-nanometer optical filter will improve the signal-to-noise ratio by excluding most other light. The lens 214 can be of the cylinder type. The LED 110 can also beam light out through its own optical system (not shown).

The electric voltage signal output from the photo diode 210, that follows the intensity of the flickering light, is analyzed and decoded by a decoder 220. The decoder 220 may use commercially-available bar-code software (or, it can use similar or other software, and/or equivalent circuits).

The decoder 220 is coupled to the input 250 by a search control 240, that is also coupled to the alarm 260 (exemplified by the buzzer 264 or light 262 of FIG. 1). If the entered identifier or identifier fragment is registered by the search unit, the alarm control 260 notifies the user.

A database (not shown) can be used to store various identifiers, as desired. The search unit 240 can be coupled to an external data link (not shown), so that identifiers and/or other information can be sent and received.

Other architectures than that shown in FIG. 2 can be used, as long as the identifier flickered from the item 101 can be registered.

(FIG. 2 also shows a clock 222 coupled to the decoder 220. This is discussed below.)

The action described above is analogous to that of a retail bar code system in which the decoded identifying number of a scanned item is checked against a database list of items on sale. If the item is not on the list, no additional action is taken; if it is on the list, and therefore on sale, the price is discounted and the clerk may be alerted by an alarm, such as a display on a cash register, stating the item is on sale.

COMPARISON TO BAR CODE TECHNOLOGY. For encoding the full identifier, a widely-used alphanumeric bar code encryption, such as Code 93, Code 39, or Code 128, may be advantageous because decoding software is available. Another possibility is to use the ASCII code to convert the identifier to binary digits, and then to encode the binary digits using the 2 of 5 Code, a bar code in which spaces are uniform in length and bars are of two lengths, short and long. In this invention, the spaces might take the form of intervals of no light and the bars be intervals of light emission (or, the converse). If the identifier is numeric, then a known numeric encoder such as UPC can be used.

Any code, conventional or custom, can be used. Codes used in TV remote controls can also be adapted to this invention. As noted, the most preferred encoding will usually be a straight translation from the dark-light pattern of a bar code already associated with the item, to a temporal pattern of lamp flickers.

The electric signal from the photo diode 210 will be decoded very rapidly as compared to the signal received by a bar-code scanner, because the decoding software has much less work to do than when a bar code is read. There are several reasons why the flickering light of this invention is easy to read.

(1) The flickering lamp of this invention produces a very clean signal. An ordinary 660-nm LED has a turn-on or turn-off time of about 200 ns, that is, $2\times10^{-7}$ s, fifth of a millionth of a second, and that means that the pulses from the LED have hard vertical edges and will appear on an oscilloscope as a "square wave" type of signal. The pulses do not need to be "digitized" as do the signals read by a bar code scanner, which are wavy due to the width of the scanning dot and imprecise printing of the bar code, as is explained at page 83 of "The Bar Code Book" by Roger C. Palmer, 3rd Ed., Helmers Publishing Company, Peterborough, N.H., ISBN 0-911261-09-5, essential portions of which are incorporated herein by reference.

(2) A bar code scan produces a variable bit rate because the bar might be farther or closer to the scanner, may be tilted, or may be on a round surface like the outside of a tin can. But the clock 122 of the unit 100 can easily be to have a precise output, so the detector 200 will not need to adjust the timing of the digitized pulses; their timing will be constant.

(3) In this invention, the light intensity will not vary over the time interval occupied by one repetition of the flicker; that is because the environment (e.g., the distance of a moving item from the detector) will not vary appreciably over the duration of one brief flicker pattern. This also simplifies the processing and software requirements as compared to bar code reading.

(4) The flickering signal of the invention is never reversed, which happens in bar code scanners when the laser beam retraces its path or the scanned item is held the other way around. The UPC bar codes used in retailing include start and end code portions, to inform the decoding device of when the bar code is backwards. This, of course, complicates decoding and increasing processing time.

Thus, the software and processing requirements in this invention are less stringent than those for bar code reading, and persons of skill in the art will have no difficulty in choosing an existing system, simplifying existing bar code software, or designing new software, for this invention.

Because the flickers from the lamp 110 can be decoded very fast and reliably, the identities of large numbers of items can be registered very quickly. For example, all of the files on a wall full of files can be registered in a few seconds.

TIMING OF THE FLICKERS. The flicker rate or binary bit rate can be quite rapid. As noted, an ordinary red LED has an on-off time of about 200 ns, that is, $2\times10^{-7}$ s or a fifth of a millionth of a second. Because of this rapid switching between light-emitting and non-light-emitting states, short binary-bit pulse intervals of, for instance, $0.5\times10^{-5}$ s (a two-hundred-thousandth of a second) are practical for transmission by LED. The latter interval is 250 times as long as the first.

Assuming for example that the ASCII code is used, in which each letter or character is represented by seven bits (for example, "B" is 1000010), an entire transmission comprising 140 bits will take less than one thousandth of a second with the bit length of a two-hundred thousandth of a second from the example above. The bit rate can be adjusted as needed in view of various factors of the electronic hardware and the environment.

The repetition rate (the rate or frequency at which an entire identifier transmission is repeated), in the example above, can be as rapid as 1000 repetitions per second (1 kHz, which is the inverse of the transmission duration: 1/1000 s=1 kHz). But such a high repetition rate is not needed, and a rate substantially lower that the flicker duration is preferred, for the following reasons.

Any repetition rate over about twenty per second will appear to the eye as a steady light (due to the persistence of vision) and will not distract a person's attention. For this reason, the repetition rate might be set higher than the persistence time of the human eye, which is about a twentieth of a second (20 Hz). On the other hand, the battery life will increase if the flickers occur at longer intervals.

The repetition rate should be low enough that the probability of overlapping flickers from different items is low, since the flicker-recognition software used by the detector will have trouble distinguishing simultaneous flickers. If the user points the detector at a wall of files, the detector can read them all sequentially without having to sort out interfering flickers. The repetition rate may be varied slightly from item to item, so that chance overlaps between items will not recur over and over.

Conversely, the repetition rate should also be high enough that the user will not have to wait long for the item to register.

As compared to a lamp that is off (not emitting light) between flicker repetitions, the flickering may be repeated at a lower rate without the flicker being visible, because of the steady shining in between flicker repetitions. (The flickering itself will be much too rapid to be perceived as an interruption in the steady shining of the lamp). For example, a repetition rate of only 1 Hz (one repetition each second) might be advantageous because a greater number of items can be scanned simultaneously. A detector aimed at a large collection of items has the potential to detect the flickers of hundreds or thousands of items. This invention therefore contemplates different repetition rates for different lamps on the same item (or, different items).

Because it may be desirable to halt the flickering for relatively long intervals, a preferred drive circuit for the lamp 110 might include some kind of delay circuit, so that long periods of non-flickering would not need to be recorded in memory as a monotonous series of 1's or 0's, avoiding a large memory 126 with most memory areas devoted to the time interval between flickers.

OVERLAPPING FLICKERS. Despite the provision of a relatively long quiescent period between flickers, and the variation of repetition rate from item to item, there might be overlaps of flickers from two items both impinging on the photo detector 210 at the same time. This does not arise with bar code reading, so off-the-shelf bar code software will not be able to separate the two signals.

Referring to FIG. 2 again, a preferred embodiment of this invention includes a detector clock 222 coupled to a decoder 220 of the detector 200. The rate of the clock 222 is preferably set equal to (or to a multiple or even fraction of) the rate of the clock 122 of the flickering lamp 110. When a flicker signal arrives at the decoder 220 from the photo detector 210, the decoder can then determine the phase difference between the incoming signal and the clock 222 pulses, and use that to discriminate one flicker signal from another. For example, the raw signal can be converted from a "square wave" to spikes triggered by the leading edges of the raw signal, and time-filtered according to its phase. In this way, a signal with any other phase is filtered out. Persons of skill will understand that two or more signals can be read simultaneously with this method by using two filters and two analyzing circuits. The clock 222, when synchronized with the clock 122 or a multiple of it, can also be used to help decode a single flicker.

Because of the signal strength of any one signal is constant, as mentioned above, two overlapping signals can also be separated according to their signal strengths (amplitudes).

This invention also covers an alternative embodiment of the detector (not shown) in which video imaging technology (such as a CCD imaging device) is used. If a collection of items is imaged, spatial isolation as well as temporal isolation of the flickers from the different items is possible. A flickering pixel or pixel group can be detected and filtered from the rest of the image and analyzed. Any simultaneous flickering from another area of the image could be stored for later analysis by a single decoder, avoiding the need for two decoders. A virtual-scanning program can be used to compensate for the motion of the detector. A CCD can also be used as a non-imaging photodetector.

The invention is not limited to the particular embodiments specifically recited but rather encompasses all within the scope of the following claims. The present disclosure is not to be construed as limiting the scope of the invention or of the following claims. The objects of the invention are apparent from the description above.

Any other identifying number, character, etc., can be used in this invention. The identifier can be numeric, alphanumeric, alphabetical, or symbolic, or a pure binary number or pattern.

The flickering lamp of this invention can, as an alternative, radiate light in more than one intensity so that the encoding of the item identifier is other than binary. For example, three states would be provided by two light levels of higher and lower intensity and a lamp-off state. However, binary encoding with only one lamp-on state is preferred.

Encoding based on the timing of pulses is also possible. One example would be uniform short light blips, each indistinguishable from the others, but conveying information through their timing (somewhat like FM radio or phase modulation).

The motion of the detector need not be by hand, nor need the detector be hand-held. In a warehouse, particularly, a detective robot can patrol the collection of items, constantly searching for mis-shelved items, by incorporating this invention. Because motion is relative, the invention is just as useful when the detector is stationary and the items move. The hollow arrow in FIG. 1 represents relative, not absolute motion, and the items could be on a conveyor belt or the like, moving past a point where their identities or groups are registered.

In an environment where flickers would be distracting, infrared or ultraviolet flickering lamps can be used.

The invention also includes the use of analog encoding and any other encoding that will work in this invention.

Above, and in the following claims:

"alarm" means any device for alerting or notifying a user, and also includes a trigger (for example, a device to open a gate automatically) that functions without human intervention.

"alphanumeric" means comprised of letters, numerals, symbols, or any combinations thereof;

"binary flickering rate interval" means the time occupied by a binary digit or pulse;

"flickering duration" means the time taken to flicker out an identifier and associated data or signals;

"flicker repetition interval" means the time between the start of one flickered identifier and the start of a succeeding flickered identifier;

"identifier" means any pattern that can be associated with a land item;

"group/identity" means the group or groups to which an item belongs, and/or an individual identity of the item;

"lamp" is any device producing light;

"LED" means any solid-state lamp or light-emitting device, and is not limited to diodes;

"light" means visible light, far and/or near infrared and ultraviolet light;

"locating" means providing information to a user that places an item in a particular place or area at a particular time.

I claim:

1. A process of locating an item belonging to a collection of items in diverse places, the item having an individual identity within the collection, belonging to a group within the collection, or having an individual identity within the collection and also belonging to a group within the collection; the process comprising steps of:

attaching to each item in the collection a respective lamp emitting optical flickers that encode a group/identity of that item;

providing a detector defining a detection location, wherein information relating to the group/identity of the item to be located has been input to the detector;

moving the detector relative to the collection of items; and registering the item to be located, according to the information input to the detector, when the item to be located flickers within the detection location.

2. The process of claim 1, wherein the group/identity of the item comprises more than one group.

3. The process of claim 1, wherein the flickers comprise fields and at least one of the fields comprises a subset, a superset, or an individual identity of the of the item.

4. The process of claim 3, comprising finding a mis-filed item by a partial identifier of the mis-filed item, wherein the partial identifier comprises the superset of the mis-filed item.

5. The process of claim 1, wherein one of the optical flickers is common to a plurality of items.

6. The process of claim 1, wherein the detector comprises a translator to translate a first group-identity of the item to a second group/identity of the item.

7. The process of claim 1, comprising registering a plurality of items within a single detection location.

8. The process of claim 1, wherein the detection location is defined by an angle of detection.

9. The process of claim 1, wherein the group/identity comprises a sequential identifier belonging to a sequence of group/identity identifiers.

10. A system to identify or locate an item belonging to a distinct subset of a collection of items; the system comprising:
- a respective flickering lamp, attached to each item in the collection to emit light in a temporal pattern, the pattern including at least a portion special to a respective subset of each item;
- a memory attached to each respective item and coupled to the lamp to encode the pattern of each respective item;
- a light sensor registering light over an angle of detection, the sensor inputting light from the flickering lamp and outputting a raw signal; and
- a digital processor coupled to the light sensor, inputting the raw signal and outputting an identification of the distinct subset upon detection of the portion special to the distinct subset of the item to be identified or located;
- wherein information relating to the distinct subset of the item to be identified or located has been input to digital processor.

11. The system of claim 10, wherein the distinct subset or respective subset comprises as few as a single individual item.

12. The system of claim 10, wherein the light sensor has a light sensitivity and each lamp has a luminosity such that the light sensor can register flickers from a plurality of lamps within the angle of detection.

13. The system of claim 12, wherein the angle of detection of the light sensor encompasses a plurality of the items in the collection.

14. The system of claim 10, wherein the memory comprises a programmable read-only memory.

15. The system of claim 10, wherein the light sensor comprises a hand-held unit.

* * * * *